United States Patent
DiFoggio (10) Patent No.: US 9,885,591 B2
(45) Date of Patent: Feb. 6, 2018

(54) LOW ETENDUE LIGHT SOURCE FOR FIBER OPTIC SENSORS IN HIGH TEMPERATURE ENVIRONMENTS

(71) Applicant: Rocco DiFoggio, Houston, TX (US)

(72) Inventor: Rocco DiFoggio, Houston, TX (US)

(73) Assignee: BAKER HUGHES, a GE company, LLC, Houston, TX (US)

(*) Notice: Subject to any disclaimer, the term of this patent is extended or adjusted under 35 U.S.C. 154(b) by 90 days.

(21) Appl. No.: 15/073,972

(22) Filed: Mar. 18, 2016

(65) Prior Publication Data

US 2017/0268908 A1 Sep. 21, 2017

(51) Int. Cl.

| | |
|---|---|
| *E21B 47/00* | (2012.01) |
| *G01D 5/26* | (2006.01) |
| *H01K 1/06* | (2006.01) |
| *H01K 7/02* | (2006.01) |
| *G01D 11/28* | (2006.01) |
| *G02B 6/32* | (2006.01) |
| *H01K 1/26* | (2006.01) |
| *G02B 6/44* | (2006.01) |

(52) U.S. Cl.
CPC ............. *G01D 5/268* (2013.01); *E21B 47/00* (2013.01); *G01D 11/28* (2013.01); *G02B 6/32* (2013.01); *G02B 6/4436* (2013.01); *H01K 1/06* (2013.01); *H01K 1/26* (2013.01); *H01K 7/02* (2013.01)

(58) Field of Classification Search
CPC .......... E21B 21/08; E21B 34/06; E21B 47/10; E21B 49/00; E21B 47/00; G01D 5/3473; G01D 5/268; G02B 6/4436; H01K 7/02
USPC .............................. 250/227.14, 227.11, 214.1
See application file for complete search history.

(56) References Cited

U.S. PATENT DOCUMENTS

| | | | |
|---|---|---|---|
| 7,423,258 B2 | 9/2008 | DiFoggio et al. | |
| 7,511,819 B2 | 3/2009 | DiFoggio | |
| 7,717,618 B2 | 5/2010 | Saxena et al. | |
| 8,599,378 B2 * | 12/2013 | Merchez ............ | G01N 15/1436 |
| | | | 356/335 |
| 2005/0127279 A1 | 6/2005 | Harris | |
| 2007/0133004 A1 | 6/2007 | Duplain et al. | |
| 2013/0021615 A1 | 1/2013 | Duncan et al. | |
| 2015/0146174 A1 | 5/2015 | Ferri et al. | |

OTHER PUBLICATIONS

Ilic et al., "Tailoring high-temperature radiation and the resurrection of the incandescent source", Nature Nanotechnology, Jan. 11, 2016, pp. 1-7.

(Continued)

*Primary Examiner* — Que T Le
(74) *Attorney, Agent, or Firm* — Cantor Colburn LLP (57) ABSTRACT

A fiber optic sensor to determine a property in an environment with a temperature exceeding 150 degrees Celsius includes a light source to emit broadband light, an etendue of the light source being less than 1000 square micro meter-steradians ($\mu m^2$ sr), and an optical fiber to carry incident light based on the broadband light and a reflection resulting from the incident light. A photodetector detects a resultant light based on the reflection and outputs an electrical signal, and a processor processes the electrical signal from the photodetector to determine the property.

15 Claims, 5 Drawing Sheets

(56) References Cited

OTHER PUBLICATIONS

Kim et al., "Bright visible light emission from graphene", Nature Nanotechnology 10, 2015, pp. 1-5 (Abstract only) retrieved Feb. 16, 2016 from the Internet http://www.nature.com/nnano/journal/v10/n8/full/nnano.2015.118.html.
International Search Report and Written Opinion for PCT Application No. PCT/US2017/022892, dated May 10, 2017, pp. 1-13.

* cited by examiner

LOW ETENDUE LIGHT SOURCE FOR FIBER OPTIC SENSORS IN HIGH TEMPERATURE ENVIRONMENTS

BACKGROUND

Sensors and measurement devices are used in many environments. The information provided by these devices facilitate decision making. For example, in sub-surface exploration and production efforts, many sensors are used to obtain information about the sub-surface environment and the formation properties. This information may be used to make a variety of decisions including, for example, decisions about drilling direction, speed, and equipment maintenance. Exemplary sensors include acoustic sensors, nuclear magnetic resonance (NMR) sensors, and fiber optic sensors. Fiber optic sensors include sensors in which the optical fiber is the sensing element and senses properties such as, for example, strain, temperature, and pressure. Fiber optic sensors also include sensors in which the optical fiber supplies the light used in sensing such as, for example, in spectroscopy. The sensors used in a given environment must be able to withstand the conditions of the environment to function effectively.

SUMMARY

According to an embodiment, a fiber optic sensor to determine a property in an environment with a temperature exceeding 150 degrees Celsius includes a light source configured to emit broadband light, an etendue of the light source being less than 1000 square micro meter-steradians ($\mu m^2$ sr); an optical fiber configured to carry incident light based on the broadband light and a reflection resulting from the incident light; a photodetector configured to detect a resultant light based on the reflection and output an electrical signal; and a processor configured to process the electrical signal from the photodetector to determine the property.

According to another embodiment, a method of obtaining a property with a fiber optic sensor in an environment with a temperature exceeding 150 degrees Celsius includes disposing a light source in the environment, the light source emitting broadband light and having an etendue less than 1000 square micro meter-steradians ($\mu m^2$ sr); disposing an optical fiber to carry incident light based on the broadband light and a reflection resulting from the incident light; disposing a photodetector to detect a resultant light based on the reflection and output an electrical signal; and configuring a processor to process the electrical signal from the photodetector to determine the property.

BRIEF DESCRIPTION OF THE DRAWINGS

Referring now to the drawings wherein like elements are numbered alike in the several Figures.

DETAILED DESCRIPTION

As noted above, sensors such as fiber optic sensors may be used in a variety of environments. Some environments, such as the sub-surface environment, are high temperature environments with temperatures exceeding 150 degrees Celsius. The different types of fiber optic sensors have in common an optical fiber and a light source. As noted above, the light from the light source may be supplied by the optical fiber (as in spectroscopy) or the light from the light source may facilitate using the optical fiber as the sensing element. Different types and configurations of fiber optic sensor may be used to measure strain, temperature, pressure, and other quantities.

While the light source may be located at the surface in some cases, the fiber optic sensors according to embodiments detailed herein relate to fiber optic sensors that include the light source in a high temperature environment, such as the downhole environment. Light from the downhole light source is introduced into the optical fiber, and this light is modified (in intensity, phase, polarization, wavelength or transit time) based upon the value of the quantity to be measured or the light is provided to the sensing element (e.g., spectrographic analyzer). For measuring physical properties such as pressure, temperature, and strain, a Fiber Bragg Grating (FBG) is often written into the fiber. As the spacing between FBG lines changes due to environmental pressure, temperature, or strain, the specific color of light, out of a band of colors of incident light, which is reflected back from the FBG changes. Correspondingly, there is a reduction in transmitted light intensity at that same color within the band of colors of the light that are transmitted. Using a broad band of colors, rather than a very narrow band of colors (a laser) for the light input allows interrogation of multiple FBGs that are written into the fiber at different locations, each having a sufficiently different grating line spacing so that the environmentally-induced shifts in the respective FBG reflected colors do not overlap between different FBGs, thus allowing distributed sensing and measurements all along the fiber using a single light source. The optical fiber may have a core diameter on the order of microns (micrometers).

Thus, the light source must not only withstand high temperatures without decreasing light intensity but must also exhibit low etendue. Etendue is a property indicating how spread out the light is in both area and angle. When the etendue of light from a light source is high, only a tiny portion of that light can be launched into the narrow optical fiber core, which is extremely inefficient. Embodiments of the systems and methods herein relate to a fiber optic sensor including a light source that maintains light intensity at high temperatures (over 150 degrees Celsius) and exhibits low etendue (below 1000 square micrometer steradians, $\mu m^2$ sr). One exemplary embodiment detailed herein is a fiber optic sensor with a graphene light source.

Figure 1:
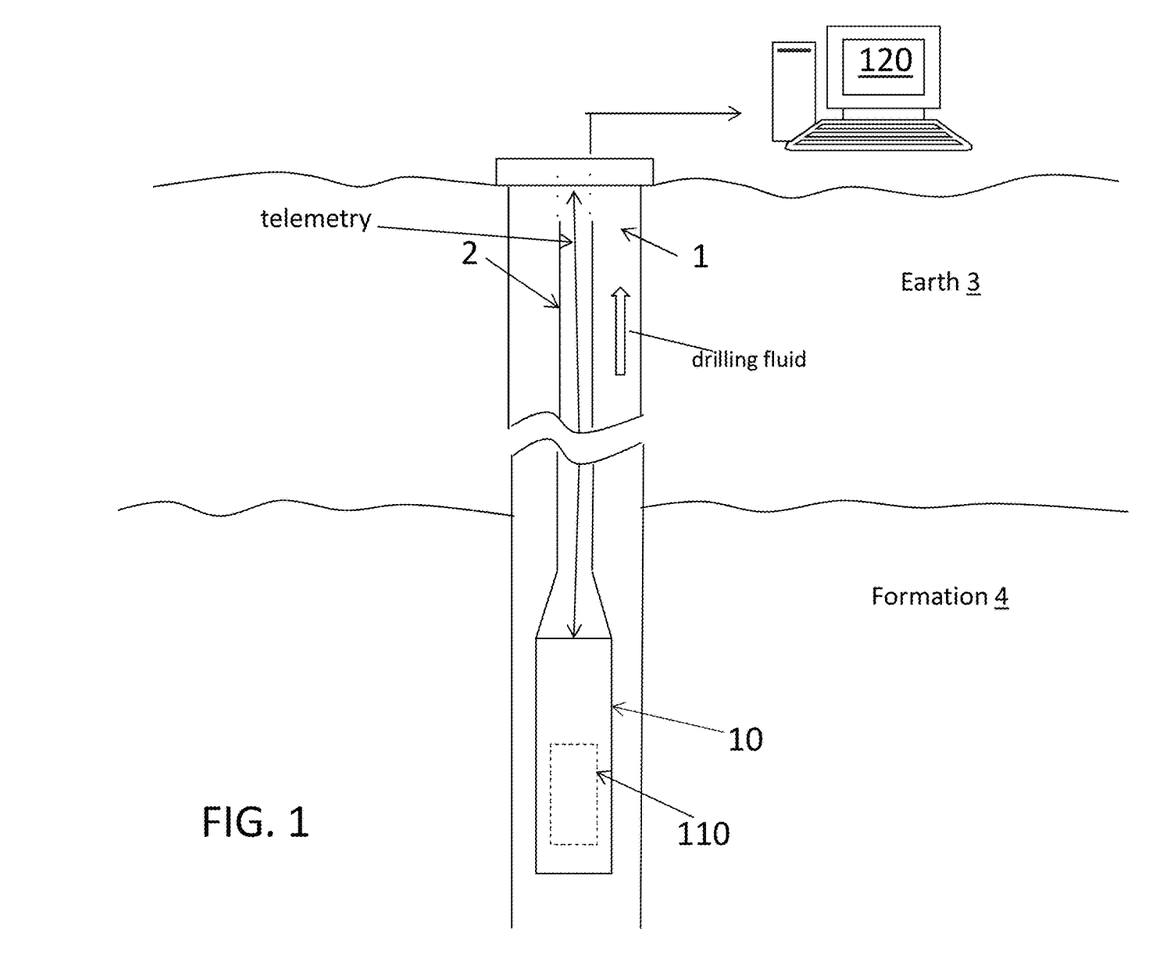
FIG. 1 is a block diagram of a fiber optic sensor according to embodiments of the invention in an exemplary sub-surface environment.

FIG. 1 is a block diagram of a fiber optic sensor 110 according to embodiments of the invention in an exemplary sub-surface environment. FIG. 1 shows a borehole 1 that penetrates the earth 3 which includes a formation 4. A set of tools 10 may be lowered into the borehole 1 by a string 2. In embodiments of the invention, the string 2 may be a casing string, production string, an armored wireline, a slickline, coiled tubing, or a work string. In measure-while-drilling (MWD) embodiments, the string 2 may be a drill string, and a drill would be included below the tools 10. Information from the sensors and measurement devices included in the set of tools 10 (e.g., the fiber optic sensor 110) may be sent to the surface for processing by the surface processing system 120 via a fiber link or telemetry. Different embodiments of the fiber optic sensor 110 are detailed further below with reference to FIGS. 3 and 4.

Figure 2:
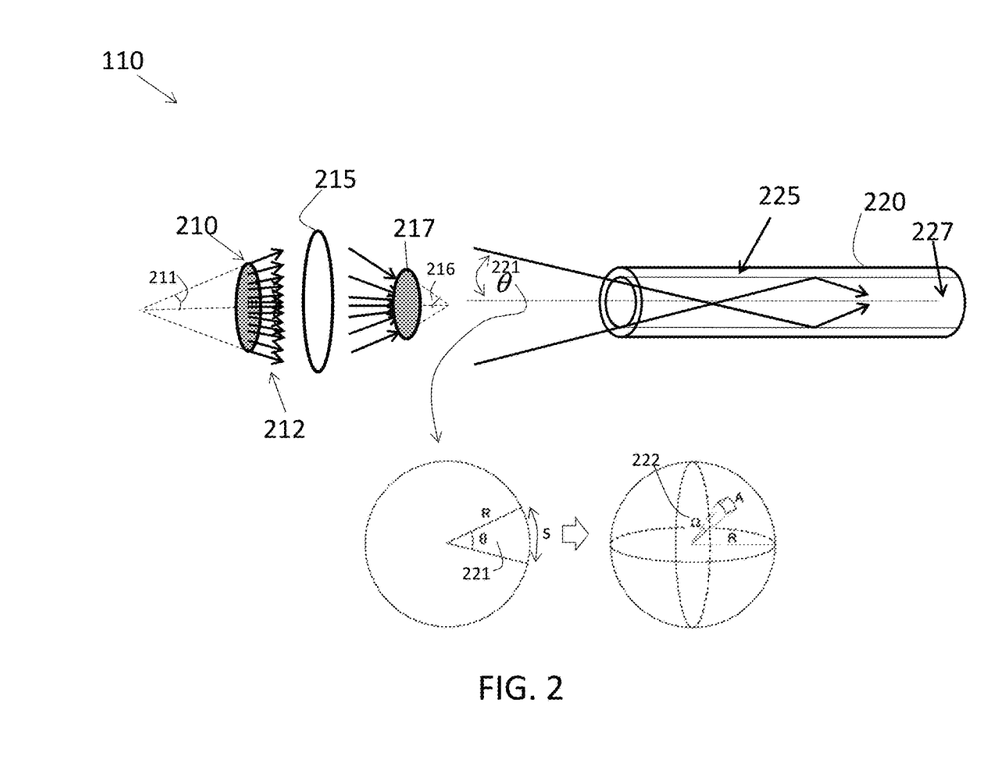
FIG. 2 illustrates features of the light source and optical fiber of the fiber optic sensor according to embodiments.

FIG. 2 illustrates features of the light source 210 and optical fiber 220 of the fiber optic sensor 110 according to embodiments. FIG. 2 shows the etendue (extent of spatial and angular spread) of the light 212 emitted by the light source 210. Etendue increases in a lossy or scattering optical system, and etendue is conserved in a lossless optical system with only perfect lenses and mirrors. However, etendue cannot be reduced by a lens 215 or other component. Source etendue can be calculated as the integral, over all infinitesimal areas on the light source, of the dot product of the light direction with the normal to that area, over all angles multiplied by the square of the refractive index, n, in which the source is immersed. For a source that is immersed in vacuum or air, n is essentially equal to one. The concept of etendue conservation can be expressed more simply by the common approximation:

light source area*source solid angle=image area*image solid angle [EQ. 1]

Source solid angle and image sold angle refer to three-dimensional angles. An optical fiber 220 has a cone of acceptance for light impinging upon that fiber. When shown in cross-section, the cone of acceptance appears as a planar half-angle (shown in FIG. 2 as θ 221). When this planar half-angle is rotated about one side, a conical volume of revolution corresponding to the cone of acceptance is generated.

In the cross-sectional view shown in FIG. 2, the source cone planar angle 211 and the image cone planar angle 216 are indicated. The relationship between cross-sectional planar angle 211, 216 and solid angle is explained below with reference to the planar angle θ 221 associated with the opening in the optical fiber 220. Ideally, the image planar angle 216 would match the planar angle θ 221 of the optical fiber 220 such that all light 212 generated at the light source 210 enters the optical fiber 220. However, the image planar angle 216 associated with most light sources 210 (not shown to relative scale in FIG. 2) is likely to be larger than the planar angle θ 221 of the optical fiber 220 such that most of the light 212 from the light source 210 is not introduced into the optical fiber 220. This represents a source of inefficiency. Accordingly, embodiments herein describe a low etendue light source 210 (i.e., one resulting in a smaller image planar angle 216 for a given light source area and image area).

The solid angle Ω 222 shown in FIG. 2 corresponds with the planar angle θ 221 in the cross-sectional view shown for the optical fiber 220. The planar angle θ 221 (in the cross-sectional view) is regarded as the acceptance angle or angle at which incoming light is accepted into the optical fiber 220 in air. The optical fiber 220 includes a fiber cladding 225 surrounding a fiber core 227. The light from the light source 210 is launched into the fiber core 227 at an opening of the optical fiber 220. The planar angle θ 221 (in the cross-sectional view) is expressed in radians and is given by:

$$\theta = \frac{s}{R} \quad [EQ. 2]$$

As shown in FIG. 2, s is the subtended arc length, and R is the radius of the optical fiber 220 which corresponds to the area A. That is, the planar angle θ 221 in radians is the ratio of a subtended arc (s) of a circle to the radius (R) of the circle. The solid angle Ω 222 is expressed in steradians (sr) and is given by:

$$\Omega = \frac{A}{R^2} \quad [EQ. 3]$$

That is, the solid angle Ω 222 is the ratio of the subtended area (A) of the surface of a sphere to the square of the radius (R) of the sphere. Thus, written in terms of the planar angle θ 221, the solid angle Ω 222 is given by:

$$\Omega = 2\pi(1 - \cos\theta) \quad [EQ. 4]$$

The diameter of the fiber core 227 is generally on the order of 9 micrometers (μm). This corresponds with an acceptance angle or planar angle θ 221 in the cross-sectional view given by:

$$\theta = \arcsin(NA_{fiber}) = \arcsin\left(\frac{\sqrt{n_{core}^2 - n_{cladding}^2}}{n_0}\right) \quad [EQ. 5]$$

The numerical aperture of the optical fiber 220 is indicated as $NA_{fiber}$. The index of refraction is n, and $n_0$ indicates the index of refraction of air, which is what the optical fiber 220 is immersed in. The value of $n_0$ is 1 in vacuum and is also 1, to within 300 parts per million, in air. The index of refraction of the fiber core 227 ($n_{core}$) and the index of refraction of the fiber cladding 225 ($n_{cladding}$) are known values for the optical fiber 220.

For the exemplary optical fiber 220 with a 9 μm fiber core 227 diameter, the acceptance angle or planar angle θ 221 is 15 degrees based on EQ. 5. According to EQ. 4, the solid angle Ω 222 is then 0.2 sr. This corresponds to an etendue of 14 μm² sr. Laser diodes are available with etendue below 14 μm² sr and even as low as 1 μm² sr. However, laser diodes dim dramatically as temperature increases (most laser diodes stop lasing above 110 degrees Celsius), emit too narrow a wavelength spectrum to be used for distributed sensing of many FBGs along a fiber, and have a reliability lifetime that is 10 to 100 times shorter than most light emitting diodes. Incandescent graphene emits a far broader band of light than even superluminescent diodes (which are known for having broad band light emission) so incandescent graphene enables the use of many thousands of spectrally non-overlapping FBGs for distributed sensing along enormous lengths (miles) of fiber. Further, incandescent graphene enables performing optical spectroscopy over a broad range of wavelengths from visible to near-infrared, infrared, and far-infrared.

Practically speaking, a wide-band light source with an etendue of only 14 μm² sr is not available for high temperature use. For example, lasers are used as low-etendue light sources for fiber optic sensor systems with the light source at the surface, but the use of lasers in a borehole 1, for example, is impractical due to the environmental temperatures. This is due to a dramatic drop in light intensity with temperature of any semiconductor light source (e.g., light emitting diode (LED), super luminescent light emitting diode (SLED), laser diode). For example, above 125 degrees Celsius, the optical power output of an SLED drops below the minimum needed to make a measurement. On the other hand, the light intensity of a graphene incandescent light source 210 would not drop with temperature because it is not a semiconductor light source. The operational temperature of incandescent graphene is far higher than any borehole 1 temperature, for example. If high environmental temperature (e.g., in the borehole 1) affected the incandescent graphene, the effect would be a slight increase in temperature that resulted in a corresponding increase (rather than decrease) in the light output.

To obtain light output that is brighter but more narrow band (similar in bandpass to an SLED), the incandescent filament may be surrounded by a nanophotonic interference filter 517 (FIG. 5) designed to recycle some light (such as infrared) that is outside of the user-selected wavelength bandpass by reflecting it back to the filament (making it hotter and brighter) while transmitting only the desired bandpass of light. Among sources that can withstand high temperatures, etendue is a factor in their utility for purposes of fiber optic sensors 110. A one square millimeter light emitting diode (LED), for example, provides an image planar angle 216 around 25 degrees, which corresponds with a solid angle of 0.6 sr and an etendue of 600,000 $\mu m^2$ sr. As another example, a one square millimeter tungsten (W) filament provides an image planar angle 216 around 180 degrees (into all of space or $4\pi$ sr), which corresponds with an etendue of Ser. No. 12/566,370 $\mu m^2$ sr.

According to embodiments herein, the light source 210 exhibits an etendue less than 1000 $\mu m^2$ sr. As noted above, one exemplary embodiment involves a graphene filament 510 (FIG. 5) as the light source 210. This is discussed further with reference to FIG. 5. A 5-micron by 5-micron light-emitting portion of graphene filament 510, emitting into all of space or $4\pi$ sr, exhibits an etendue of about 314 $\mu m^2$ sr. By way of comparison, the etendue of an exemplary 5-micron by 5-micron graphene filament 510 is approximately 2000 times lower (600,000/314) than a square millimeter LED etendue and 40,000 times lower (Ser. No. 12/566,370/314) than a square millimeter tungsten filament etendue. In addition, as noted above, graphene can withstand temperatures well above 150 degrees Celsius without a loss in light 212 intensity. The operating temperature of a nanoscale graphene light emitter has been estimated to be 2850 Kelvin (K), which is far hotter than the hottest oil or gas wells of 250 degrees Celsius (523 K). Thus, a high temperature environment, such as the borehole 1 environment, will have a negligible effect on the intensity or on the peak wavelength of emission of an incandescent graphene light source 210. Further, the thermal conductivity of graphene above about 1800 K is greatly reduced (unlike that of tungsten, for example) so that the center of the graphene filament 510 stays very hot but that heat is not easily transferred to the two end supports, which stay far cooler. This simplifies the support of this free-hanging structure on a micron scale and reduces the power draw needed to maintain a hot center temperature. Further, the heat localization within the graphene filament 510 reduces the area of the light emission (about 25 square microns, for example, for the 5-micron by 5-micron region 515 (FIG. 5) of the graphene filament 510), thereby reducing the corresponding etendue.

Figure 3:
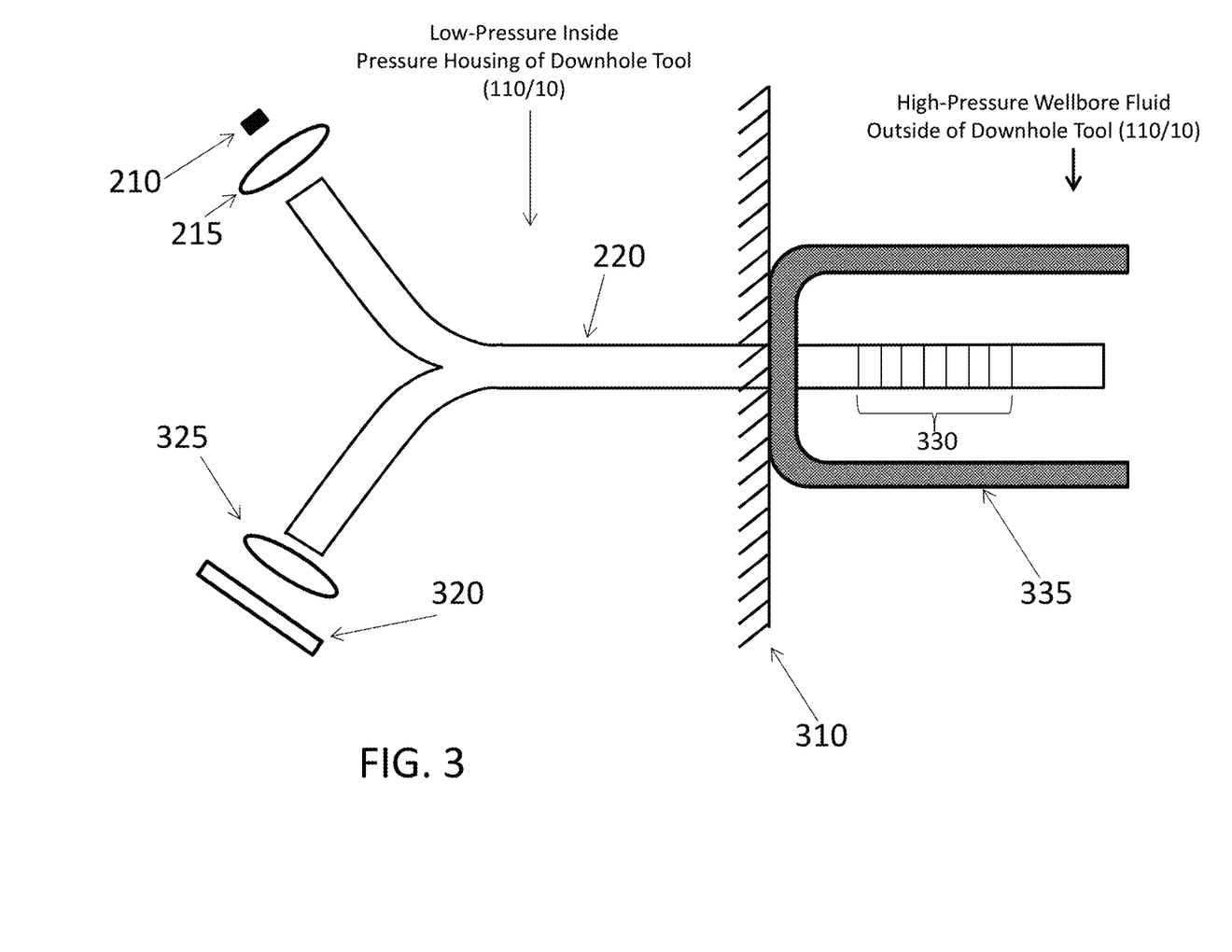
FIG. 3 is a block diagram of a fiber optic sensor as a pressure sensor according to an embodiment.

FIG. 3 is a block diagram of a fiber optic sensor 110 as a pressure sensor according to an embodiment. This exemplary embodiment is provided for explanatory purposes to indicate the arrangement of the light source 210 with the optical fiber 220 and other components of the fiber optic sensor 110. However, as noted above, a fiber optic sensor 110 in which the optical fiber 220 acts as the sensing element may sense temperature, strain, acoustics, and other properties and is not limited to being a pressure sensor. The fiber optic sensor 110 is disposed partially inside and partially outside a pressure housing, whose wall 310 is indicated in FIG. 3. The wall 310 of the pressure housing may coincide with the wall of the tool 10 housing shown in FIG. 1, for example. The part of the fiber optic sensor 110 that is outside the wall 310 (the portion that acts as the sensing element) must be exposed to the pressure to be sensed. That is, the portion of the optical fiber 220 that acts as the sensing element is exposed to the wellbore fluid (outside the tool 10 housing) whose pressure is measured according to the exemplary embodiment.

The portion of the optical fiber 220 that acts as the sensing element includes fiber Bragg gratings (FBGs) 330. The wavelength of the reflected signal differs from the wavelength of the incident signal based on the FBGs 330, and the effect of the FBGs 330 further varies based on pressure in a quantifiable way. A sand shield 335 may be disposed to shield the FBGs 330. The light source 210 may be a graphene filament 510 (FIG. 5) according to an embodiment. A lens 215 may or may not be used to direct the light from the light source 210 into the optical fiber 220 (fiber core 227). The reflected signal affected by the FBGs 330 is directed through the lens 325 to a photodetector 320. The photodetector 320 may provide the reflections for processing (e.g., via the telemetry link to the processing system 120) or a processor may be part of the fiber optic sensor 110 (545, FIG. 5).

Figure 4:
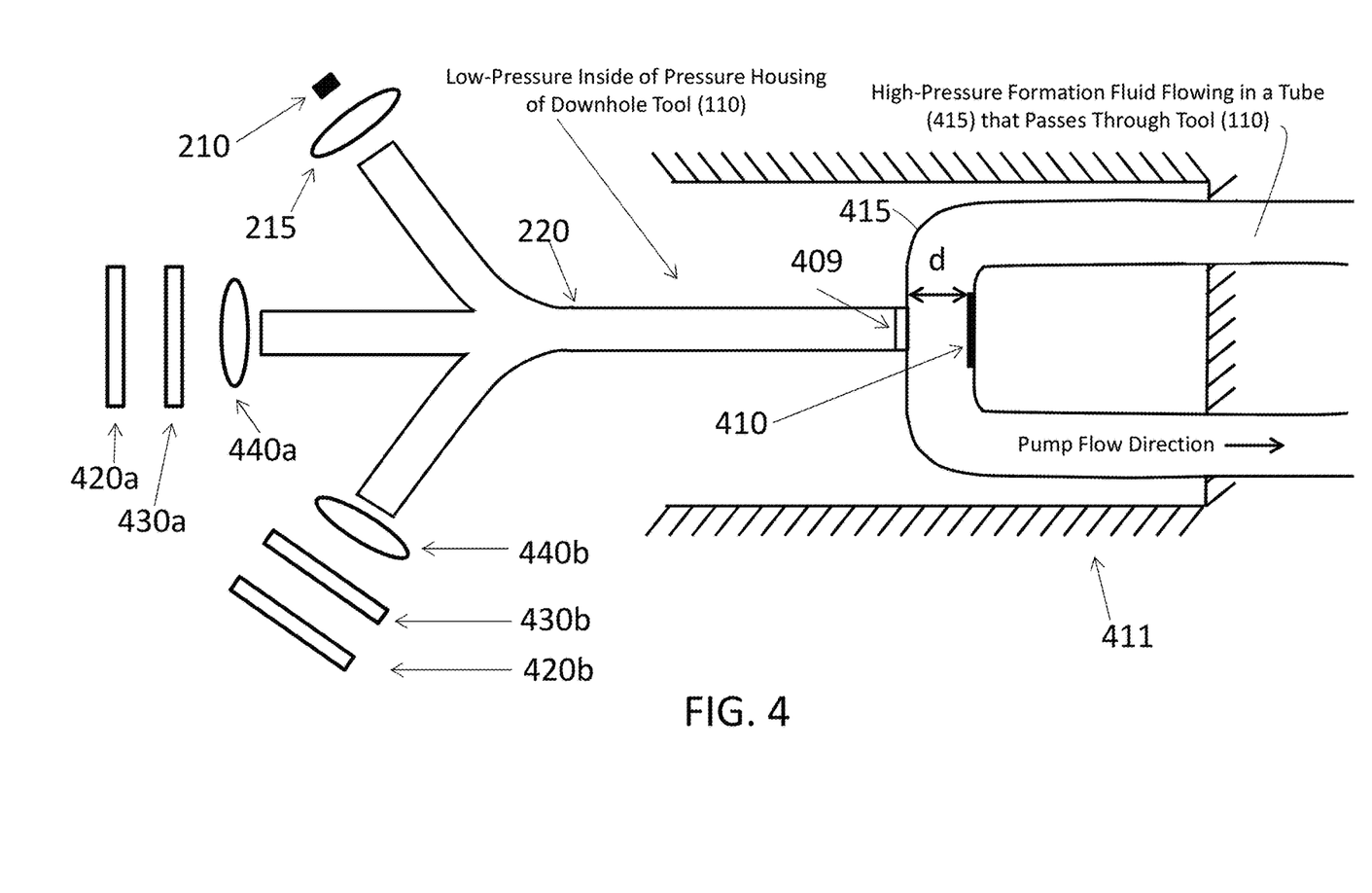
FIG. 4 is a block diagram of a fiber optic sensor with the optical fiber supplying light for spectroscopy according to an embodiment.

FIG. 4 is a block diagram of a fiber optic sensor 110 with the optical fiber 220 supplying light for spectroscopy according to an embodiment. The orientation of the fiber optic sensor 110 is not limited and may be, for example, vertical or horizontal. According to an exemplary embodiment, the fiber optic sensor 110 may be shown sideways in FIG. 4 with respect to the orientation shown in FIG. 1. That is, the light source 210 may be oriented toward the surface while the pump flow direction indicated in FIG. 4 may be oriented deeper into the borehole 1. A wall 411 creates a pressure housing inside of which is low pressure, as indicated. Wellbore fluid at higher pressure is outside the wall 411 and formation fluid flows through a tube 415 that penetrates the housing (intersects the wall 411, as shown) and the formation fluid flows past the fiber optic sensor 110. The housing may correspond with the tool 10 housing, shown in FIG. 1, for example. The fiber optic sensor 110 may also be oriented such that the housing of the fiber optic sensor 110 does not correspond with the tool 10 housing. The tube 415 includes a mirror 410. The pathlength for optical absorbance is the round trip distance through the fluid from the optical window 409 to the tube 415 to the mirror 410 and back to the optical window 409. As FIG. 4 indicates, half of the pathlength is associated with light before it hits the mirror 410, and half of the pathlength is associated with light after it hits the mirror 410. This arrangement may be referred to as a "transflectance" arrangement.

Light from the light source 210 may pass through a lens 215 before entering the optical fiber 220. The light source 210 may be a graphene filament 510 (FIG. 5) or another broadband light source with an etendue below 1000 $\mu m^2$ sr. The light encounters the formation fluid in the tube 415, which has a diameter d and is reflected by the mirror 410. Thus, the light passes through a length of 2*d (to and from the mirror 410) through the formation fluid. The reflected light passes through a lens 440a to a bandpass filter 430a that passes a particular spectrum and the passed light is received at the photodetector 420a. The same process happens for a different pass band (different part of the spectrum) when the reflected light passes through lens 440b and bandpass filter 430b to the photodetector 420b. While two bandpass filters 430a, 430b are shown, any number of filters 430 may be used to separate the signal reflected by the mirror 410 into more wavelength bands. The signals from the different photodetectors 420 are processed (within the fiber optic sensor 110) (545, FIG. 5) or at the processing system 120, for example.

As noted above, FIGS. 3 and 4 illustrate two exemplary types of fiber optic sensors 110 that may be used in a high-temperature environment such as the sub-surface environment. Relevant characteristics of the fiber optic sensors 110 according to the exemplary embodiments and other embodiments is the high temperature (e.g., greater than 150 degrees Celsius) and the small diameter (on the order of 9 μm) of the light-receiving component (the optical core 227 of the optical fiber 220 of the fiber optic sensor 110). As a result, the light source 210 of the fiber optic sensor 110 must function at temperatures exceeding 150 degrees Celsius without a reduction in light intensity and must exhibit an etendue below 1000 μm$^2$ sr.

Figure 5:
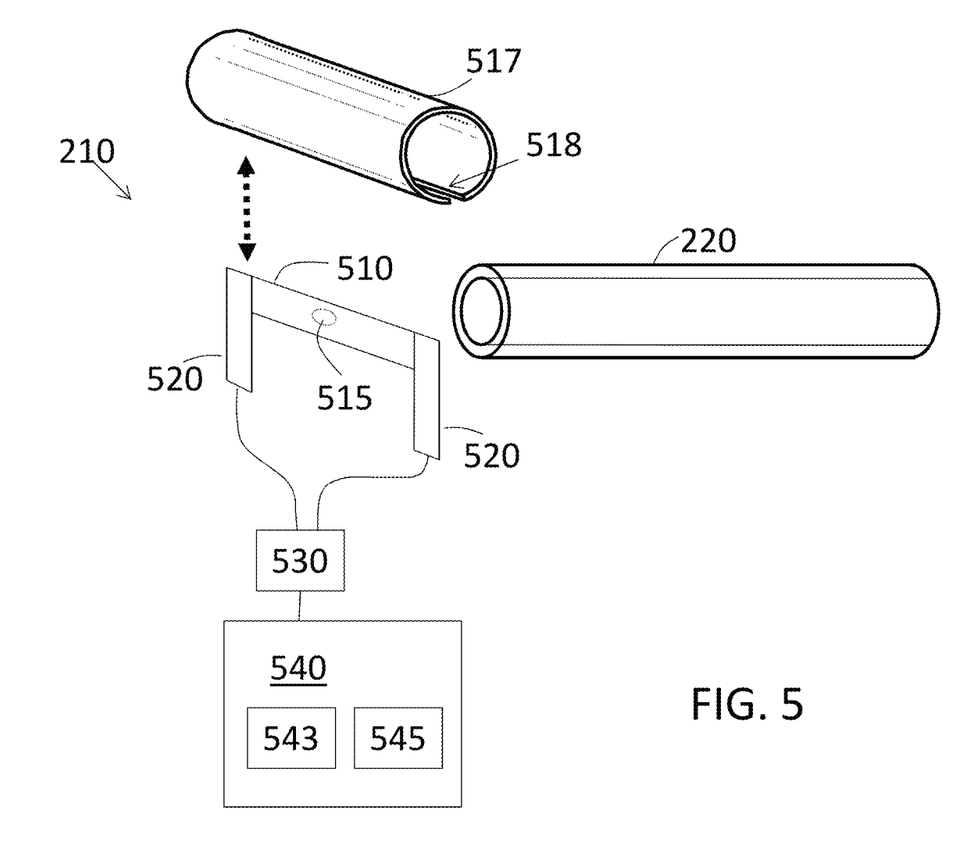
FIG. 5 is a block diagram of an exemplary embodiment of the light source of the fiber optic sensor.

FIG. 5 is a block diagram of an exemplary embodiment of the light source 210 of the fiber optic sensor 110. The exemplary light source 210 is a free-standing graphene filament 510 supported at its ends by end supports 520. The supports 520 may comprise a refractory metal that can withstand the temperatures of the graphene filament 510 without melting or sagging. Exemplary supports 520 may include tungsten, molybdenum, tantalum, or rhenium. The graphene filament 510 may be electrically biased by a voltage source 530 to initiate emission of broadband light. As shown in FIG. 5, the graphene filament 510 may be biased through the supports 520 rather than directly, according to an exemplar embodiment. The exemplary embodiment involves a strip of graphene filament 510 that is approximately 6.5 to 14 μm in length. A central region of the graphene filament 510 where the graphene filament 510 gets the hottest is indicated as region 515. The controller 540 that controls the voltage source 530 to thereby control light emission by the graphene filament 510 may include known one or more processors 545 and memory devices 543 that also process the received reflections at the photodetectors 320, 420 of the fiber optic sensor 110. An exemplary nanophotonic interference filter 517 is shown in FIG. 5 as a wrap-around cylinder with a slit 518 along the edge of the cylinder. The slit 518 facilitates optionally sliding the exemplary nanophotonic interference filter 517 over the graphene filament 510. As noted above, the nanophotonic interference filter 517 recycles some light that is outside of the user-selected wavelength bandpass by reflecting it back to the filament, thereby making the graphene filament 510 hotter and brighter while transmitting only the desired wavelengths of light.

The term "about" is intended to include the degree of error associated with measurement of the particular quantity based upon the equipment available at the time of filing the application. For example, "about" can include a range of ±8% or 5%, or 2% of a given value.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A fiber optic sensor to determine a property in an environment with a temperature exceeding 150 degrees Celsius, the sensor comprising:
    a light source configured to emit broadband light, an etendue of the light source being less than 1000 square micro meter-steradians (μm$^2$ sr);
    an optical fiber configured to carry incident light based on the broadband light and a reflection resulting from the incident light;
    a photodetector configured to detect a resultant light based on the reflection and output an electrical signal; and
    a processor configured to process the electrical signal from the photodetector to determine the property.

2. The sensor according to claim 1, further comprising a lens disposed between the light source and the optical fiber and configured to provide the incident light to the optical fiber based on the broadband light from the light source.

3. The sensor according to claim 1, wherein the light source includes a graphene filament to emit the broadband light.

4. The sensor according to claim 3, wherein a length of the graphene filament is between 6.5 to 14 μm.

5. The sensor according to claim 3, further comprising a nanophotonic interference filter configured as a cylinder to wrap around the graphene filament.

6. The sensor according to claim 1, wherein the optical fiber includes fiber Bragg gratings that effect a wavelength of the reflection.

7. The sensor according to claim 6, wherein the property is pressure, temperature, or strain.

8. The sensor according to claim 1, further comprising two or more bandpass filters, each of the two or more bandpass filters configured to pass a different set of wavelengths of the reflection.

9. A method of obtaining a property with a fiber optic sensor in an environment with a temperature exceeding 150 degrees Celsius, the method comprising:
    disposing a light source in the environment, the light source emitting broadband light and having an etendue less than 1000 square micro meter-steradians (μm$^2$ sr);
    disposing an optical fiber to carry incident light based on the broadband light and a reflection resulting from the incident light;
    disposing a photodetector to detect a resultant light based on the reflection and output an electrical signal; and
    configuring a processor to process the electrical signal from the photodetector to determine the property.

10. The method according to claim 9, further comprising disposing a lens between the light source and the optical fiber to provide the incident light to the optical fiber based on the broadband light from the light source.

11. The method according to claim 9, wherein the disposing the light source includes disposing a graphene filament to emit the broadband light.

12. The method according to claim 11, wherein the disposing the graphene filament includes disposing a graphene filament of a length between 6.5 to 14 μm.

13. The method according to claim 9, wherein the disposing the optical fiber includes disposing the optical fiber with fiber Bragg gratings that effect a wavelength of the reflection.

14. The method according to claim 13, wherein the configuring the processor includes configuring the processor to determine pressure, temperature, or strain.

15. The method according to claim 9, further comprising disposing two or more bandpass filters between the optical fiber and two or more of the photodetectors, each of the two or more bandpass filters configured to pass a different set of wavelengths of the reflection to the respective two or more of the photodetectors.

* * * * *